C. E. W. DOW.
FASTENER.
APPLICATION FILED OCT. 15, 1915.
1,213,599. Patented Jan. 23, 1917.
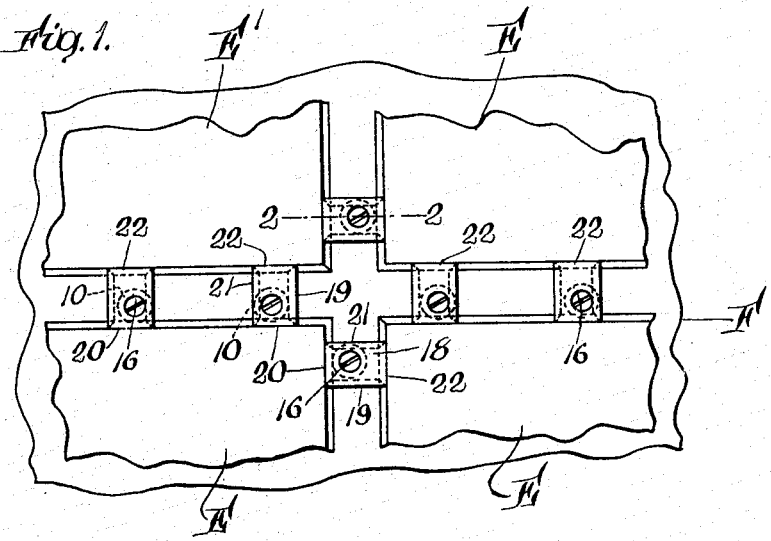
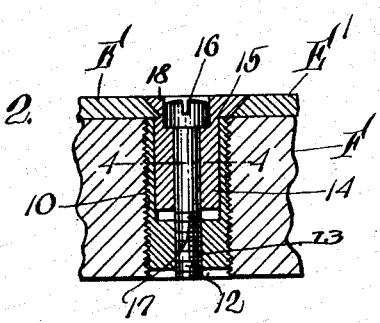
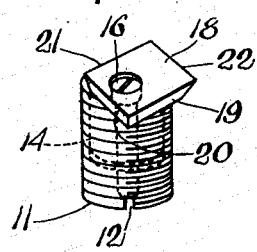
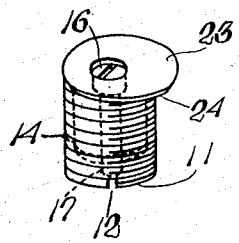
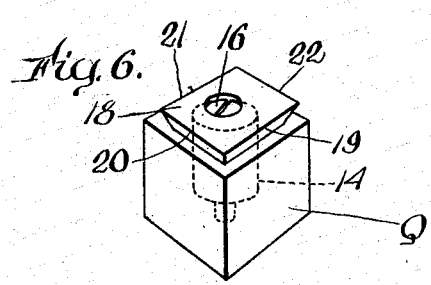
Inventor:
Charles E. W. Dow.
By Henry J. Miller
atty.

UNITED STATES PATENT OFFICE.

CHARLES E. W. DOW, OF DORCHESTER, MASSACHUSETTS.

FASTENER.

1,213,599.  Specification of Letters Patent.  Patented Jan. 23, 1917.

Application filed October 15, 1915. Serial No. 56,113.

*To all whom it may concern:*

Be it known that I, CHARLES E. W. DOW, a citizen of the United States, residing at Dorchester, in the county of Suffolk and State of Massachusetts, have invented a new and Improved Fastener, of which the following is a specification, reference being had to the accompanying drawings, forming part thereof.
This invention has reference to an improved fastener device which is particularly adapted for use in detachably securing electrotypes or plates to their bases.

One object of this invention is to so construct a fastener and particularly a fastener adapted to secure one or more electrotypes or other plates to a base that the engaging member of the fastener may be adjusted, by rotation of some part of the fastener, relative to various points from its axis.

Another object of the invention is to so construct a fastener of the nature herein described and having a holding or engaging member of polygonal shape that said member may be adjusted to engage an element to be secured at various distances from the axis of said member.

Another object of the invention is to provide an improved fastener of the nature hereinafter described.

The invention consists in the manner in which the engaging member is mounted for adjustment.

The invention also consists in such other novel features of construction and combination of parts as shall hereinafter be more fully described and pointed out in the claims.

Figure 1, represents a plan view of a portion of a form bed having a series of the improved fasteners and illustrating the manner in which a series of electrotypes or other printing devices having suitable edges may be secured in place on said form bed by the use of these improved fasteners. Fig. 2, represents a sectional view of a portion of the same taken on line 2—2 Fig. 1. Fig. 3, represents a perspective view of the improved fastener removed from the form bed.
Fig. 4, represents a cross sectional view of the fastener taken on line 4—4 Fig. 2. Fig. 5, represents a perspective view showing an engaging and holding member or fastener head of modified form. Fig. 6, represents a perspective view of a quad having the improved fastener device.

Similar characters of reference designate corresponding parts throughout.

In carrying this invention into practice in its preferred form I construct the socket 10 having a screw threaded exterior, a smooth bore and the end member 11 having the transverse groove 12 and the screw threaded perforation 13 which in the construction herein shown is located approximately at the axis of the member 11. The purpose of the exterior screw thread of said socket 10 is to facilitate the insertion and engagement of said socket in a perforation of a suitable form bed F which may be of any nature, shape or known construction adapted to receive the electrotypes E, E or other well known printing appliances. The groove 11 is adapted to receive a screw driver or other tool by means of which said socket 10 may be screwed into or out of its perforation.

Rotatably received by the bore of the socket 10 is the sleeve or perforated shank 14, which is preferably shorter than the bore of said socket and has the counter-sunk seat 15 to receive the head 16 of the securing screw 17 which latter is engaged in the screw threaded perforation 13 of the socket end 11. The sleeve, shank or carrier 14 carries the securing member or plate 18 which is formed in part with or is attached to said carrier or shank 14 and is located eccentrically to the axis of said shank 14 in such manner that at least two and preferably all of its bevel engaging edges 19, 20, 21 and 22 are located at different perpendicular distances from the axis of said carrier 14, whereby said securing member 18 with its shank 14 may be rotated to bring said engaging edges to points of engagement with electrotypes E, E' of various sizes or having their nearest edges at various distances from the axes of the carrier sleeves or shanks 14 or of the screws 17.

In Fig. 5 of the drawing is shown the carrier or shank 14 in all respects similar to that shown in Figs. 1 to 4 inclusive but having the circular disk engaging device or plate 23 disposed eccentrically to the axis of said carrier sleeve 14 and having the bevel edge 24.

In Fig. 6 of the drawing the improved fastener is shown as applied to the metal quad Q which slug is or may be of any usual nature adapted for use in the printing art. In the application of the fastener to this quad Q, the quad is supplied with a bore or socket of a diameter to receive the sleeve or carrier 14 of the engaging member 18 and the bottom of said socket has an axially disposed screw threaded bore to receive the end portion of the screw 17.

The use of the improved fastener will be understood by reference to the drawings and particularly to Figs. 1 and 2 thereof in which it will be seen that the bevel edges of the electrotype plates E, E' are engaged by the complemental edges of the securing member 18 and that, by the tightening of screw 17 said securing member may be caused to draw the edges of said electrotypes against the surface of the form bed F. The release of the electrotypes is of course effected by loosening one or more of the fastener screws 17 until the securing members 18 related to such loosened screws are free, with their carrier sleeves or shanks 14, to slide outward sufficiently to permit the electrotypes to be released.

At the left hand side of Fig. 1 it will be noticed that the plate or member 18 extends a greater distance from the screw head 16 to the edge 22, engaging electrotype E' than the extension of said member 18 from said screw head 16 to the edge 20. It may be desirable to transpose these electrotypes E' and E and such transposed electrotypes may be secured in place by reversing the positions of the edges 20 and 22 of the member 18. It may also be desirable to substitute other, slightly larger electrotypes for those shown at said left hand side of Fig. 1 and such larger electrotypes may be received by giving the members 17, 17 a one quarter rotation to bring the edges 19 and 21 in position to engage the respective electrotypes.

I have herein referred to the member 18 as of polygonal shape as it is evident that it may be supplied with a multiplicity of engaging and holding edges or devices 19, 20, 21 and 22 and is not restricted to a rectangular shape. It is also evident that for some purposes of accurate adjustment the circular member 23 may be preferred.

Having thus described my invention I claim as new and desire to secure by Letters Patent.

1. A fastener of the nature described comprising an exteriorly screw threaded socket member having a bore, a fastener having a shank slidable and rotatable in said bore, and a releasable means engaged with said socket member for securing said fastener member from sliding or rotating, said fastener member, its shank and the bore of said socket member being so related that said fastener member may rotate on an axis eccentric to its periphery.

2. A fastener of the nature described, comprising a socket member, a shank adapted to slide longitudinally into said socket member and having a polygonal engaging member, the axis of which is offset from the axis of said shank, and means to secure said shank to said socket member.

3. A fastener of the nature described, comprising an exteriorly screw threaded socket member having an end wall furnished with a screw threaded perforation, a shank rotatable and slidable in the bore of said socket and having an axial perforation and a polygonal engaging member offset laterally from its axis, and a screw extending through the perforation of said shank and engaged with the screw threaded perforation of said socket member.

CHARLES E. W. DOW.

Copies of this patent may be obtained for five cents each, by addressing the "Commissioner of Patents, Washington, D. C."